April 26, 1960 A. PETRIW 2,934,643
COINCIDENCE DETECTOR
Filed Jan. 6, 1959
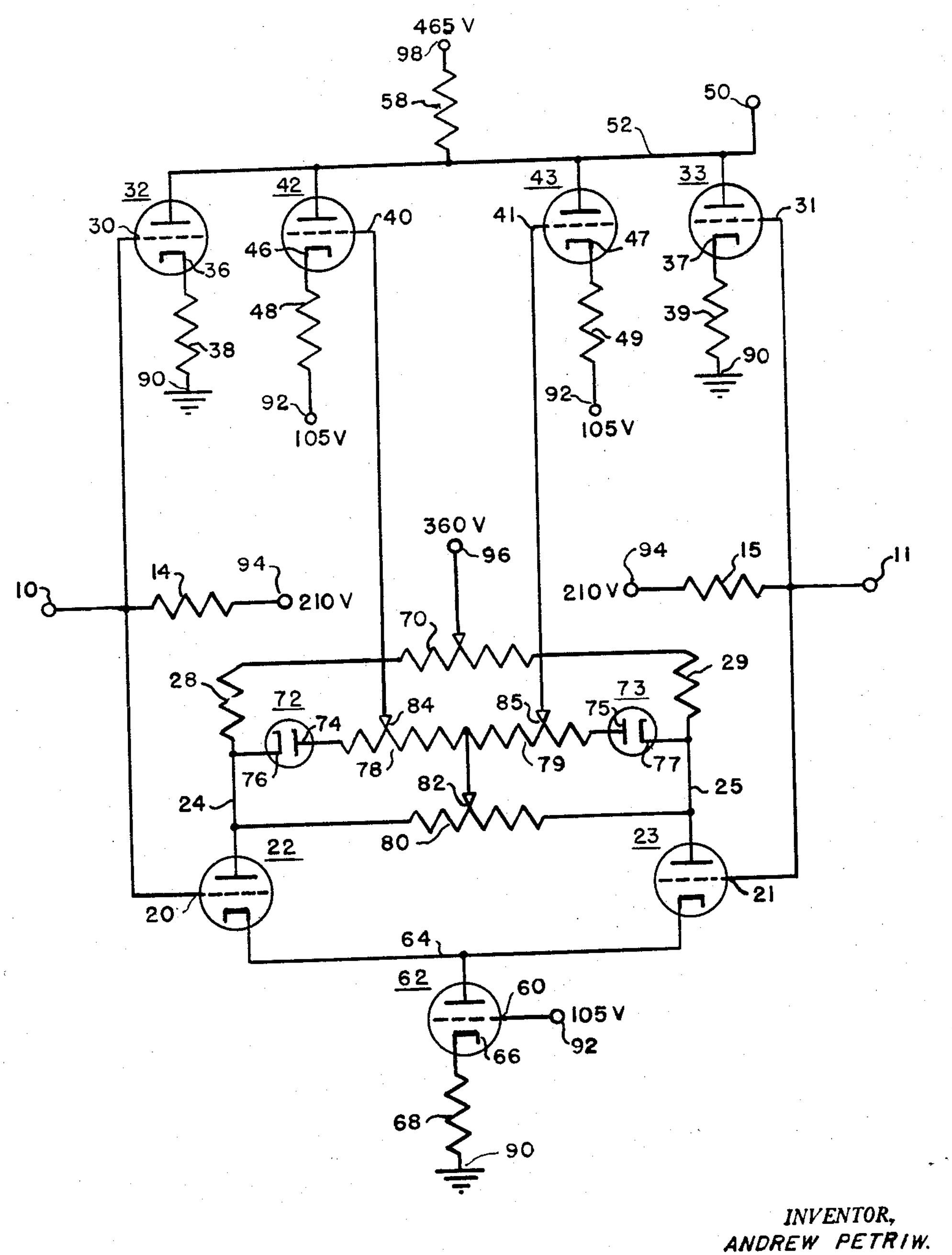
INVENTOR,
ANDREW PETRIW.
BY Harry M. Saragovitz
ATTORNEY.

2,934,643
Patented Apr. 26, 1960

2,934,643

COINCIDENCE DETECTOR

Andrew Petriw, Spring Lake Heights, N.J., assignor to the United States of America as represented by the Secretary of the Army Application January 6, 1959, Serial No. 785,298

5 Claims. (Cl. 250—27)

(Granted under Title 35, U.S. Code (1952), sec. 266)

The invention described herein may be manufactured and used by or for the Government for governmental purposes, without the payment of any royalty thereon.

This invention relates to detectors and particularly to those for detecting signals in the presence of noise. More particularly, this invention relates to multiple channel systems for detecting the coincidence of signals and simultaneously cancelling noise.

One of the most critical problems in radio or sound transmission and reception is the detection of signals in the presence of noise. The ultimate range of transmission and the accuracy of radio communication is ultimately dependent on the ability of a receiver to detect signals in the presence of noise.

There are several approaches to this problem including that of the many popular types of squelch circuits but these are only effective where the signal is substantially greater than the surrounding noise level. A more effective way of improving the reception is to use two or more receivers—as in space diversity reception—which can not only maintain reception thru intermittent fading at one of the receivers but, more important from the standpoint of noise, also can provide coincident useful signals which are more easily detectable.

In these systems the two or more separate signals are added algebraically so that the noise impulses, which are random and relatively rarely coincident in both channels, are statistically attenuated while the transmitted signals, which are coincident, are algebraically added to provide a positive more clearly readable signal even in the presence of a noise level comparable to that of the signal. The algebraic coincident system requires substantially equal signals for most effective operation.

Another method of combining two or more received channels is a correlation method which includes the multiplication of the two wave forms which will substantially increase the resultant of the coincident impulses of the transmitted signals while attenuating all non-coincident information such as is found in the random noise patterns. This method does not require signals of the same magnitude for effective operation. However, this method does not have the same statistical improvement possibilities as the algebraic system when the noise is greater than the signal.

In both of these systems, the noise is not eliminated but is statistically integrated. For example, a pulse of noise in one channel that has no coincident pulse of noise in the second channel will be relatively attenuated but will still appear at the output of the system. The coincident signals will be reenforced but some noise will always be present.

It is therefore an object of this invention to provide an improved coincidence detector.

It is a further object of this invention to provide an improved device for detecting signals in the presence of considerable noise.

It is a further object of this invention to provide a system for cancelling the random noise in multiple channel receivers of the same transmitted signal to provide improved reception of the signal.

These and other objects are accomplished by providing, in addition to an algebraic adding circuit for the separate inputs from a pair of channels, a circuit for detecting the incidence of a signal on one channel and not on the other, this signal being amplified, inverted, rectified, and applied to an additional input in the algebraic adding circuit to exactly cancel the original signal appearing on only one of the channels. The transmitted signals, which are coincident on both channels, have no difference impulse detected, provide no cancelling voltage, and are applied directly to the algebraic adding circuit.

This invention will be more fully described and other and further objects of this invention will become apparent from the following specification and the drawing which shows the circuit of a typical embodiment of this invention.

Referring now more particularly to the drawing, the inputs of a pair of receiving channels are 10 and 11. Resistors 14 and 15 couple these inputs to a common voltage source 94 which establishes the bias voltage of the input circuits.

The signals from 10 and 11 are applied to the grids 20 and 21 of the tubes 22 and 23 which comprise the difference detecting circuit. The plates 24 and 25 are coupled thru plate loads 28 and 29 and balancing potentiometer 70 to another source of potential 96. The load between the two plates includes the diodes 72 and 73 in series with potentiometers 78 and 79 respectively connected to the neutral point 82 of the variable potentiometer 80 which is also connected across the plates. The potentiometers 78 and 70 have signal amplitude control taps 84 and 85 which connect respectively to the grids 40 and 41 of the tubes 42 and 43 in the algebraic adding circuit. The inputs 10 and 11 also connect to the grids 30 and 31 of the tubes 32 and 33 which are also a part of the algebraic adding circuit.

In the algebraic adding circuit, tubes 32 and 33 have their cathodes 36 and 37 connected thru cathode loads 38 and 39 to ground 90. The cathodes 46 and 47 of the tubes 42 and 43 are connected thru the cathode loads 48 and 49 to the source of potential 92. The plates of the tubes 32, 33, 42 and 43 are connected together to the common terminal 52 as is usual for this type of algebraic addition circuit. The plates are coupled thru a common load 58 to the suitable source of voltage 98. The output of the circuit is at terminal 50.

In the difference detecting circuit, tubes 22 and 23 have a common cathode coupling at plate 64 of tube 62 whose grid 60 is directly coupled to the source of potential 92 and whose cathode 66 is grounded thru the cathode resistor 68.

In operation, the circuit is direct coupled because only voltages of one polarity are to be considered. That is to say, the normal input to the circuit would be the detected wave form of an amplitude modulated or a frequency modulated signal. The detected wave forms could be considered in either the positive or in the negative sense. The polarities of the diodes 72 and 73 are such that this circuit is intended to operate with input pulses of positive polarity.

The inputs are from two separate channels both receiving the same transmitted signal but spaced as far as possible from each other in a direction normal to the direction of propagation or spaced the same distance from the transmitter so that the transmitted signals will be synchronous in the two receivers. The transmitted signals are received in both of the receivers and produce identical and synchronous outputs whereas the noise impulses would normally be random. The internal noise of the receivers will be random in any case the atmospheric or other externally generated noise will not be coincident in the two receivers excepting that small portion generated within the plane equidistant from the two receivers. The transmitted signals should be adjusted to the same average amplitude output in the receiving channels for effective use in this circuit.

When the output of the two receiving channels is applied at the terminals 10 and 11 it is applied to both the difference detecting circuit and the conventional algebraic adding circuit. The signals, being coincident and equal, will not actuate the difference detecting circuit, will produce no cancelling voltages in the adding circuit. The transmitted signals are also applied to the tubes 32 and 33 of the algebraic adding circuit and will combine to produce a signal across the load 58 and at the output 50.

A noise impulse, on the other hand, will arrive at one of the inputs without a symmetrical counterpart at the other and it will drive one of the grids of the difference detecting circuit tubes in a positive direction with respect to the other to draw more current thru that tube with respect to the other and produce a negative pulse at the plate of that tube. This negative pulse is applied thru the diode and across the potentiometer whose tap is adjusted to provide a voltage, equal and opposite to that of the original input noise impulse, to one of the tubes of the algebraic adding circuit so that there are equal positive and negative impulse signals applied to a pair of tubes in the algebraic addition circuit. This results in complete cancellation when an impulse is received on one channel and not on the other.

It should be noted that when a negative pulse appears at the plate of one tube, a positive pulse appears at the plate of the opposite tube of the difference detecting circuit. This must be equal and opposite to the negative pulse at the other plate to maintain the point 82 at A.C. ground but it is blocked by the polarity of its diode so that it does not appear across its potentiometer nor have any effect on the algebraic addition tube to which its potentiometer tap connects.

The impedance of the potentiometer 80 is made very much lower than the impedances of the potentiometers 78 and 79 so that the balance of the output loads will not be appreciably affected by the conduction through one diode circuit and not the other.

When a noise impulse arrives at the other of the inputs, it is cancelled in the same manner by the other set of tubes.

It is apparent that this circuit not only reduces the noise arriving at one or the other of a pair of channels as in conventional algebraic adding circuitry but that this circuit provides a means for completely cancelling isolated noise impulses to improve the reception and the clarity of all of the transmitted intelligence that appears on both channels simultaneously.

Although the reception of pulses has been described as a simple and practical example of the utility of this circuit, other wave forms would be similarly accommodated. All synchronous and congruent wave forms will bypass the differential circuits and be added algebraically. All nonsynchronous wave forms will develop a differential counterpart and be cancelled in the algebraic adding circuits.

It is obvious that the circuit taught here can be transistorized in a manner well known to the art.

It will also be obvious to any one skilled in the art that the circuit shown in the drawing uses high mu triode halves of a 12AT7 for 32, 33, 42 and 43 while medium mu triode halves of a 12AU7 are used for 22 and 23. Both halves of a 12AT7 are used for 62. The resistors 14 and 15 are 500,000 ohms; 28 and 29 are 9,000 ohms; 38 and 39 are 100,000 ohms; 48 and 49 are 100,000 ohms; 58 is 8,000 ohms and 68 is 13,250 ohms. The potentiometer 70 is 5,000 ohms; 80 is 60,000 ohms; and 78 and 79 are 4 megohms. The diodes 72 and 73 are 6AL5's.

The power supply which is not shown is entirely conventional and may be regulated by voltage regulator tubes VR–105 and VR–150 in series combination to obtain voltage values listed.

Having described my invention, what is claimed is:

1. In a circuit for detecting the coincidence of signals and reducing the random noise level in a two channel communications system; algebraic adding means for detecting the simultaneous coincidence of signals in said two channels; difference detecting means for detecting the occurrence of non-coincident random noise impulses of one polarity in only one of said channels; phase inverting means for reversing the polarity of said non-coincident impulses; and means, including said algebraic adding means, for combining said non-coincident impulses with the reversed polarity counterpart of said non-coincident impulses to effectively cancel said non-coincident, noise impulses.

2. In a circuit for detecting the coincidence of signals in two channels, an algebraic adding circuit having a plurality of inputs and a single output, said two channels connected to two of said inputs, a difference detecting circuit connected to said two channels for detecting a difference voltage between the voltage levels in said two channels of one polarity and producing a voltage counterpart of said difference voltage having the opposite polarity, means for applying said voltage counterpart of said difference voltage to a third of the inputs of said adding circuit, to cancel non-coincident signals which cause a difference voltage, whereas coincident signals are algebraically added.

3. In a system having at least two channels for simultaneous transmission of the same signals, a noise cancelling and signal detecting system comprising; an algebraic adding circuit having a plurality of inputs and one output, said two channels connected to two of said inputs, a circuit connected to said two channels responsive to a difference in voltage level between said two channels, said circuit including means for inverting said difference in voltage level, rectifying means connecting said inverting means to other inputs of said algebraic adding circuit to apply noise cancelling pulses to said algebraic adding circuit.

4. In a system for detecting signals in at least two channels in the presence of noise, an algebraic adding circuit having a plurality of inputs, said two channels connected to two of said inputs, a difference detecting circuit for detecting a difference in voltage level, said difference detecting circuit having two inputs connected to said two channels, said difference detecting circuit amplifying and inverting said difference in voltage level, means for applying said inverted component of said difference in voltage level to said adding circuit to cancel any signal appearing on one of said channels and not on the other while signals appearing on both of said channels are added algebraically.

5. In a system for detecting signals in at least two channels in the presence of noise, a signal detecting circuit comprising an algebraic adding circuit having a first two inputs connected to said two channels, a noise cancelling circuit comprising a difference detecting circuit having two inputs connected to said two channels, said difference detecting circuit including phase inverting means having two outputs corresponding to said two inputs, and rectifying means connecting said two outputs to a second two inputs of said algebraic adding circuit, whereby signals in the two channels will be algebraically added while random noise impulses on either channel will be cancelled.

References Cited in the file of this patent

UNITED STATES PATENTS

| | | |
|---|---|---|
| 1,244,697 | Carson | Oct. 30, 1917 |
| 1,758,940 | Gage | May 20, 1930 |